(12) United States Patent
Choi et al.

(10) Patent No.: US 11,195,684 B2
(45) Date of Patent: Dec. 7, 2021

(54) FIELD EMISSION APPARATUS WITH SUPERIOR STRUCTURAL STABILITY AND X-RAY TUBE COMPRISING THE SAME

(71) Applicant: AweXome Ray, Inc., Anyang-si (KR)

(72) Inventors: Hong Soo Choi, Seoul (KR); Se Hoon Gihm, Seongnam-si (KR); Sug Chul Kim, Busan (KR)

(73) Assignee: AweXome Ray, Inc., Anyang-si (KR)

( * ) Notice: Subject to any disclaimer, the term of this patent is extended or adjusted under 35 U.S.C. 154(b) by 0 days.

(21) Appl. No.: 16/909,667

(22) Filed: Jun. 23, 2020

(65) Prior Publication Data

US 2021/0027969 A1 Jan. 28, 2021

(30) Foreign Application Priority Data

Jul. 26, 2019 (KR) .......................... 10-2019-0090984

(51) Int. Cl.
*H01J 1/304* (2006.01)
*B82Y 30/00* (2011.01)
*H01J 1/15* (2006.01)

(52) U.S. Cl.
CPC .............. *H01J 1/304* (2013.01); *B82Y 30/00* (2013.01); *H01J 1/15* (2013.01); *H01J 2201/30469* (2013.01)

(58) Field of Classification Search
CPC . H01J 1/304–3048; H01J 2201/30453–30476; B82Y 30/00
See application file for complete search history.

(56) References Cited

U.S. PATENT DOCUMENTS

| | | | |
|---|---|---|---|
| 7,550,907 B2 | 6/2009 | Jiang et al. | |
| 8,368,295 B2 | 2/2013 | Wei et al. | |
| 10,643,816 B1* | 5/2020 | Choi | H01J 35/066 |
| 2003/0002627 A1 | 1/2003 | Espinosa et al. | |
| 2007/0003472 A1 | 1/2007 | Tolt | |
| 2009/0208742 A1 | 8/2009 | Zhu et al. | |
| 2010/0260931 A1 | 10/2010 | Malecki et al. | |
| 2014/0099852 A1* | 4/2014 | Guo | H01J 9/025 |
| | | | 445/50 |

(Continued)

FOREIGN PATENT DOCUMENTS

| | | |
|---|---|---|
| CN | 101665247 A | 3/2010 |
| CN | 103854958 A | 6/2014 |

(Continued)

OTHER PUBLICATIONS

Korean Office Action for Application No. 10-2019-0090984 dated Nov. 7, 2019 (8 pages which includes English translation).

(Continued)

*Primary Examiner* — Mariceli Santiago
(74) *Attorney, Agent, or Firm* — Young Basile Hanlon & MacFarlane, P.C.

(57) ABSTRACT

Provided is a field emission apparatus including a pipe-shaped emitter holder comprising an electrically conductive material and a first internal space communicated in a first direction, and an emitter electrode having one or more yarns each having a structure extending in the first direction in which a plurality of CNTs that extend in the first direction are aggregated, and the emitter electrode is inserted in the first internal space while extending in the first direction.

20 Claims, 7 Drawing Sheets

(56) References Cited

U.S. PATENT DOCUMENTS

| | | | |
|---|---|---|---|
| 2017/0011880 A1 | 1/2017 | Hu | |
| 2017/0292208 A1 | 10/2017 | Yoon et al. | |
| 2018/0190466 A1* | 7/2018 | Park | H01J 19/38 |
| 2020/0109492 A1* | 4/2020 | Gihm | D01F 9/127 |
| 2020/0172400 A1 | 6/2020 | Gihm et al. | |

FOREIGN PATENT DOCUMENTS

| | | | |
|---|---|---|---|
| CN | 207330368 U | | 5/2018 |
| EP | 3315644 A1 | | 5/2018 |
| JP | H05347142 A | | 12/1993 |
| JP | 2002293629 A | | 10/2002 |
| JP | 2007128892 A | | 5/2007 |
| JP | 2009117367 A | | 5/2009 |
| JP | 2011148689 A | | 8/2011 |
| JP | 2012010583 A | | 1/2012 |
| JP | 2014075336 A | | 4/2014 |
| JP | 2015149299 A | | 8/2015 |
| JP | 2016046145 A | | 4/2016 |
| KR | 20070041024 A | | 4/2007 |
| KR | 20120090383 | | 10/2010 |
| KR | 101284226 B1 | | 7/2013 |
| KR | 101387700 B1 | | 4/2014 |
| KR | 1020140147004 A | | 12/2014 |
| KR | 20160102743 A | | 8/2016 |
| KR | 20160118637 A | | 10/2016 |
| KR | 101718784 | | 3/2017 |
| KR | 1020170041365 | | 4/2017 |
| KR | 20170121266 | | 11/2017 |
| KR | 1020180044114 | | 5/2018 |
| KR | 101876076 B1 | | 7/2018 |
| KR | 20180104642 A | | 9/2018 |
| KR | 20180113374 A | * | 10/2018 |
| KR | 101962215 B1 | | 3/2019 |
| KR | 101956153 B1 | | 6/2019 |
| KR | 101992745 B1 | | 6/2019 |
| KR | 2027407 B1 | * | 12/2019 |
| TW | I386366 B | | 2/2013 |
| TW | I386965 B | | 2/2013 |
| TW | 201441445 A | | 11/2014 |
| TW | I478196 B | | 3/2015 |

OTHER PUBLICATIONS

Co-Pending U.S. Appl. No. 16/666,844, filed Oct. 29, 2019.
International Search Report in co-pending International Application No. PCT/KR2020/007596, dated Sep. 17, 2020.
Office Action dated May 13, 2021 in co-pending application TW109125012 (5 pages).

* cited by examiner

Before field emission    After field emission

Before field emission    After field emission

H1 = 1 mm

H1 = 10 mm

FIELD EMISSION APPARATUS WITH SUPERIOR STRUCTURAL STABILITY AND X-RAY TUBE COMPRISING THE SAME

CROSS-REFERENCE TO RELATED APPLICATION

This application claims the benefit of Korean Patent Application No. 10-2019-0090984, filed on Jul. 26, 2019, in the Korean Intellectual Property Office, the disclosure of which is incorporated herein in its entirety by reference.

BACKGROUND

1. Field

The present disclosure relates to a field emission apparatus with excellent structural stability and an X-ray tube comprising the same.

2. Description of the Related Art

An X-ray tube is a relatively small-sized device including a field emission apparatus which emits electrons upon application of a voltage, a metal target which radiates X-rays when the emitted electrons collide, and a tube in which the field emission apparatus and the metal target are mounted to constitute a body, and in which a vacuum channel is formed to allow electrons to pass therethrough.

The X-ray tube is widely used in a variety of industries, such as medical, food, water purification, security, and the like, in order to identify what cannot be observed by the naked eyes through X-ray transmission.

The performance of the X-ray tube may be heavily dependent on field emission performance of the field emission apparatus, specifically field emission performance of an emitter electrode constituting the field emission apparatus. Recently, carbon nanotubes (CNTs) which have an excellent characteristic of electron emission have attracted much attention as a material constituting the emitter electrode.

The CNTs have an electrical conductivity similar to that of metals and are excellent in physical and chemical stability and mechanical strength. They are advantageous in the emission of electrons through front ends thereof based on their large aspect ratios with a diameter of nanoscale and a length of more than 1,000 times the diameter.

In addition, when a voltage is applied to CNTs, the CNTs can emit electrons through the front ends thereof based on the electric field concentrated thereon and their excellent electrical conductivity. In such an event, since a required field enhancement factor is excellent, electrons can be readily emitted even in a relatively low electric field.

CNTs have been processed into various structures and used as an emitter electrode for the purpose of increasing the efficiency of electron emission by utilizing these characteristics.

One example regarding the above is to utilize a CNT fiber strand (e.g., CNT yarn) in which a plurality of CNTs are aggregated by $\pi$-$\pi$ interactions. Such a yarn may be used alone or a plurality of yarns aggregated by the $\pi$-$\pi$ interactions may be used as an emitter electrode. Hereinafter, for convenience of explanation, a CNT and a yarn, which can constitute an emitter electrode, are referred to as a common concept, "unit" of the emitter electrode.

Such an emitter electrode has an advantage that electrons can be easily emitted from a front end of each unit: in other words, electrons are concentrated at the front ends and thus they can be emitted intensively in a specific direction in which the front ends are directed.

However, since the emitter electrode described above has a structure in which a plurality of units are integrated by the $\pi$-$\pi$ interactions, the shape of the emitter electrode may be deformed when the plurality of units are disaggregated by a force that outdoes the $\pi$-$\pi$ interactions.

Examples of the cases which cause the above event to happen may include the case where stress such as overvoltage or arcing is applied to the emitter electrode and the case where the emitter electrode is used for a long time.

In addition, electrons may be mainly accumulated at the front ends of the CNTs. A repulsive force may occur between the accumulated electrons. At this point, the repulsive force may also act between different units. If such a repulsive force exceeds a cohesive force led by $\pi$-$\pi$ (interactions between the units, the units may be disaggregated. In particular, in a region adjacent to the front ends of the units, deformation that the units are spaced apart from each other by the repulsive force may occur.

Due to the deformation at the front ends, not only may the field emission efficiency of the emitter electrode decrease, but also the units may be eventually completely separated, thereby substantially losing its function.

Therefore, there is a need for a technology for improving the above-described problem.

SUMMARY

In an aspect of the present disclosure, there is provided a field emission apparatus capable of solving the technical problem as described above.

The field emission apparatus according to the present disclosure includes an emitter electrode including CNTs and an emitter holder to which the emitter electrode is stably mounted.

The emitter holder includes a first internal space communicated in a first direction. The emitter electrode includes one or more yarns each having a structure extending in the first direction in which a plurality of CNTs that extend in the first direction are aggregated. The field emission apparatus has a structure in which at least a part of the emitter electrode is inserted in the first internal space of the emitter holder along the first direction and fixed thereto.

This structure ensures structural stability that disaggregation of CNTs is inhibited by virtue of the emitter holder even if a repulsive force is caused by accumulation of electrons in the emitter electrode.

Before the present disclosure is specifically described, the terms and words used in the present specification and claims should not be construed as limited to ordinary or dictionary terms. They must be construed in accordance with the technical idea of the present disclosure based on the principle that an inventor is allowed to appropriately define the concept of terms in order to explain its own invention in the best way.

Accordingly, it is to be understood that the constitution of the embodiments described in the present specification is merely the most preferred embodiment of the present disclosure and does not represent all the technical ideas of the present disclosure; thus, various equivalents and changes for substituting them at the time of filing the present application can be made.

As used herein, a singular expression covers a plural expression unless the context clearly dictates otherwise. In this specification, it is to be understood that the terms "comprise," "provide," "have," and the like indicate the presence of features, numbers, steps, elements, or combinations thereof performed; and that they do not exclude the possibilities of the presence or addition of one or more of other features, numbers, steps, elements, or combinations thereof.

As used herein, the term "introduction" may be described interchangeably with "feed" and "injection," and it may be understood to mean the input or addition of a liquid, a gas, heat, or the like, where necessary.

As used herein, the term "aggregation" is used interchangeably with "gathering, collection, binding" and refers to a form in which a plurality of CNTs are attached to one another by the π-π interactions.

As used herein, the term "yarn" refers to any yarn formed by the growth of CNTs in a fiber form or by gathering, aggregation, and/or fusion of a plurality of CNTs in a fiber form.

As used herein, the term "base end" may refer to an end of an object or a target or a direction toward the end with respect to an arbitrary reference direction. The "front end" may refer to the other end or a direction toward the other end with respect to the arbitrary reference direction. Here, the base end may include a part that is very close to an end, a distal end, and/or an end face that constitute an object or a target. The front end may include a part that is very close to an end, a distal end, and/or the end to the distal end which are opposite to the base end. These base end and front end may be recognized as a concept of a pair and may be distinguished from a part that is very close to the other ends, the other distal ends and/or the other ends to the other distal ends.

In an embodiment, the present disclosure provides a field emission apparatus that includes an emitter holder comprising an electrically conductive material and a first internal space communicated in a first direction, and an emitter electrode including one or more yarns each having a structure extending in the first direction in which a plurality of CNTs that extend in the first direction are aggregated. The emitter electrode may be inserted in the first internal space of the emitter holder while extending along the first direction.

In one specific example, the emitter electrode may be inserted in the first internal space with at least a part thereof electrically in contact with an inner surface of the emitter holder, so that electric currents flow between the emitter holder and the emitter electrode.

In one specific example, the emitter holder may include a band-shaped first front end, a band-shaped first base end, an inner surface extending in the first direction between an inner periphery of the first front end and an inner periphery of the first base end and defining the first internal space, and an outer surface extending in the first direction between an outer periphery of the first front end and an outer periphery of the first base end. The first internal space may extend in the first direction from the first front end to the first base end. The emitter electrode may comprise a second front end and a second base end.

In one specific example, when the first direction is perpendicular to the ground, the second front end may be located higher with respect to the ground than the first front end such that a remaining part of the emitter electrode other than a part inserted in the first internal space is located protruding upward from the first front end.

At this point, a range of a first height, which is a length in the first direction between the second front end and the first front end, may be, for example, 10 micrometers to 20 millimeters, preferably 100 micrometers to 5 millimeters, more preferably 100 micrometers to 1 millimeter. In addition, a second height, which is a total length of the emitter electrode in the first direction, may be 200 micrometers to 40 millimeters, specifically 1 millimeter to 15 millimeters.

A first height, which is the length in the first direction between the second front end and the first front end, may be 0.25% to 50%, specifically 1% to 40%, more specifically 5% to 40%, of a second height, which is a total length of the emitter electrode in the first direction.

Alternatively, a first height, which is a length in the first direction between the second front end and the first front end, may be 0.25% to 100,000%, specifically 5% to 20,000%, more specifically 10% to 500%, further more specifically 20% to 150%, of a length of a longest line among lines that pass through a center of gravity of a cross sectional shape of the emitter electrode and that connect facing contours of the shape.

In one specific example, when the first direction is perpendicular to the ground, the first front end may comprise: an inclination tapered along a circumference of the first front end such that a boundary formed between the outer surface of the emitter holder and the outer periphery of the first front end is located relatively lower than a boundary formed between the inner surface of the emitter holder and the inner periphery of the first front end; or an inclination tapered along the circumference of the first front end such that a boundary formed between the outer surface of the emitter holder and the outer periphery of the first front end is located relatively higher than a boundary formed between the inner surface of the emitter holder and the inner periphery of the first front end.

In one specific example, an electrically insulating material may be coated on a surface of the first front end.

In one specific example, when the first direction is perpendicular to the ground, the second base end may be located higher with respect to the ground than the first base end such that a part of the emitter holder is located protruding downward from the second base end.

In one specific example, when the first direction is perpendicular to the ground, the first base end may be located at the same height as the second base end.

In one specific example, when the first direction is perpendicular to the ground, the first front end may be located at the same height as the second base end.

In one specific example, a thickness of the emitter holder, which is a vertical distance between the inner surface and the outer surface of the emitter holder when measured in the direction perpendicular to the first direction, may be 10 micrometers to 10 millimeters.

In one specific example, on a cross section perpendicular to the first direction, a diameter of the first internal space may be 50 nanometers to 10 millimeters, and a shape of the first internal space may be selected from the group consisting of a circle, an ellipse, a semicircle, and a polygon. A length of a longest line among lines that pass through a center of gravity of a cross sectional shape of the emitter electrode and that connect the facing contours may be 50 nanometers to 10 millimeters.

In one specific example, the emitter holder may be formed of at least one material selected from a group consisting of tungsten, zinc, nickel, copper, silver, aluminum, gold, platinum, tin, stainless steel and conductive ceramics.

In one specific example, each of the plurality of yarns is formed of a plurality of CNTs with sides thereof aligned side by side in the first direction, and the sides of the plurality of CNTs are aggregated by the π-π interactions to constitute each yarn.

In one specific example, the emitter electrode may include a plurality of yarns with sides thereof aligned side by side in the first direction, and the sides of the plurality of yarns are coupled to one another.

In another embodiment, the present disclosure provides an X-ray tube including the field emission apparatus.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
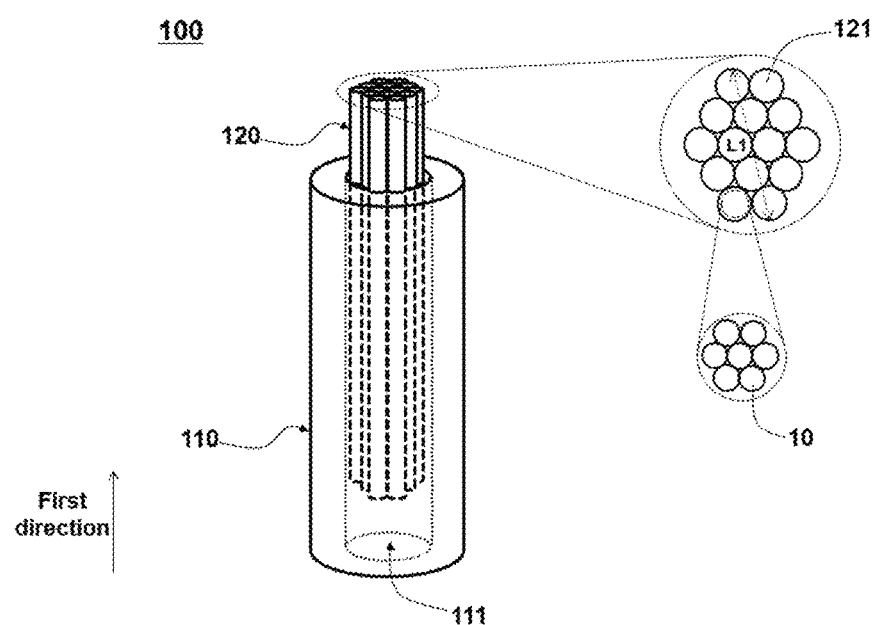
FIG. 1 is a schematic diagram of a field emission apparatus according to an embodiment of the present disclosure.
Figure 2:
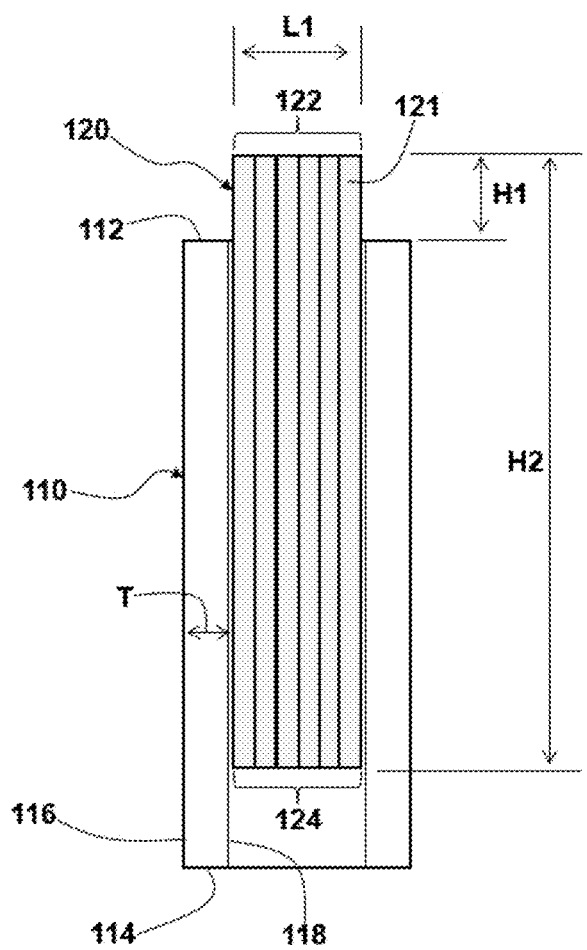
FIG. 2 is a schematic diagram of a cross section of the field emission apparatus of FIG. 1, which is taken along a first direction.
Figure 3:
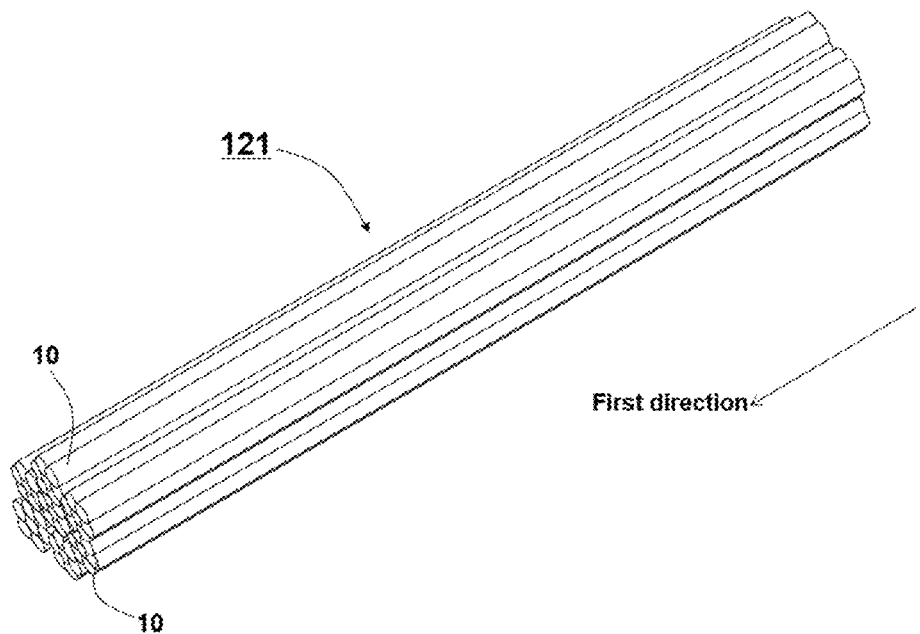
FIG. 3 is a schematic diagram of a yarn according to the present disclosure.

FIG. 1 is a schematic diagram of a field emission apparatus according to one embodiment of the present disclosure, and FIG. 2 is a schematic diagram of a cross section of the field emission apparatus of FIG. 1, which is taken along a first direction. In addition, FIG. 3 is a schematic diagram of the yarn.

The structure of a field emission apparatus will be described in detail with reference to the aforementioned drawings.

A field emission apparatus 100 may include an emitter holder 110 and an emitter electrode 120.

The emitter electrode 120 may include a second front end 122 and a second base end 124. The emitter electrode 120 may also include a plurality of yarns 121 having a structure extending in a first direction in which a plurality of CNTs 10 that extend in the first direction are aggregated. Specifically, the emitter electrode 120 may include the plurality of yarns 121 with sides thereof aligned side by side in the first direction, and may be in a structure in which the contiguous sides of each of the plurality of yarns 121 are coupled to one another by the π-π interactions.

Each yarn 121 may be formed of a plurality of CNTs 10 with sides thereof aligned side by side in the first direction. In particular, each yarn may be in a structure in which the contiguous sides of the plurality of CNTs 10 are aggregated by the π-π interactions.

In some cases, a conductive adhesive such as a CNT paste, a silver paste, and/or a solvent capable of enhancing the π-π interactions may be applied between the contiguous CNTs 10 and/or between the yarns 121 to directly adhere the contiguous CNTs 10 and/or the yarns 121 or to enhance the π-π interactions.

The solvent may be an at least one organic solvent selected from the group consisting of ethane, ethylene, ethanol, methane, methanol, propane, propene, propanol, acetone, xylene, carbon monoxide, chloroform, acetylene, ethyl acetic acid, diethyl ether, polyethylene glycol, ethyl formate, mesitylene (1,3,5-trimethylbenzene), tetrahydrofuran, dimethylformamide, naphthalene, anthracene, dichloromethane, ketone, ether, hexane, heptane, octane, pentane, pentene, hexene, benzene, carbon tetrachloride and toluene, but it is not limited thereto.

In general, most of the electrons in the CNTs 10 or in the yarns 121 formed of the CNTs 10 may be emitted from the front ends of the CNTs 10 and the yarns 121 in a direction in which the front ends are directed.

It should be noted that the emitter electrode 120 of the present disclosure is in a structure in which substantially all the front ends of the CNTs 10 and the yarns 121 are arranged toward the first direction to constitute a single second front end 122. Based on the above-described structure, the emitter electrode 120 may emit most electrons from the second front end 122 intensively in a direction in which the second front end 122 is directed, thereby exhibiting an excellent field emission efficiency.

The emitter electrode 120 described above is merely one embodiment of the present disclosure. As yet another embodiment of the present disclosure, the emitter electrode 120 may of course be formed of a single yarn 121 instead of the plurality of yarns.

A total length H2 of the emitter electrode 120 may be 20 micrometers to 40 millimeters, specifically 1 millimeter to 15 millimeters. Since the emitter electrode 120 in an excessively long length H2 is capable of being easily bent or deformed by a force exceeding its range of elastic deformation, it is preferable that the length H2 is appropriately designed within the scope of the present disclosure.

The cross section of the emitter electrode 120 may be perpendicular to the first direction, and the longest line among lines that pass through the center of gravity of the cross sectional shape of the emitter electrode 120 and that connect the facing contours of the cross section may have a length L1 selected within a predetermined range. The predetermined range may be 50 nanometers to 10 millimeters, specifically 500 nanometers to 5 millimeters, more specifically 500 nanometers to 2 millimeters.

In general, the area where electrons are distributed immediately upon the emission thereof from the emitter electrode 120 substantially corresponds to the cross sectional area of the emitter electrode 120. It is not advantageous in that the emission range of electrons may be very limited if the length L1 of the line is less than the above range, whereby the cross sectional area of the emitter electrode 120 is thus excessively narrowed.

Accordingly, designing the length L1 to be unconditionally long by taking the emission range of electrons into account may be considered. Yet, if the length L1 exceeds the above range, the CNTs 10 or the yarns 121 may be likely to be disaggregated in a procedure of processing the CNTs 10 or the yarns 121 into the form of the emitter electrode 120, for example, in a cutting procedure. This is because a relatively large pressure able to exceed the π-π interactions is required for the cutting procedure as the length L1 increases.

The emitter holder 110 may be formed in a pipe shape including a first internal space 111 that is communicated in the first direction. In addition, the emitter holder 110 may be formed of an electrically conductive material capable of performing electrical conduction with the emitter electrode 120. Specifically, the emitter holder 110 may be formed of an electrically conductive material having mechanical strength not to be deformed by a repulsive force accumulated in the emitter electrode 120.

Preferably, the emitter holder 110 may be formed of at least one material selected from the group consisting of tungsten, zinc, nickel, copper, silver, aluminum, gold, platinum, tin, stainless steel and conductive ceramics. Specifically, the emitter holder 110 may be formed of stainless steel.

The conductive ceramic is not particularly limited and may be a ceramic-based material including at least one element selected from the group consisting of Sn, Ga, In, TI, As, Pb, Cd, Ba, Ce, Co, Fe, Gd, La, Mo, Nb, Pr, Sr, Ta, Ti, V, W, Y, Zr, Si, Sc, Ni, Al, Zn, Mg, Li, Ge, Rb, K, Hf, Cr, Si, B, C, O, S, P, and N.

The emitter holder 110 may also include a band-shaped first front end 112, a band-shaped first base end 114, an inner surface 118 extending in the first direction between an inner periphery of the first front end 112 and an inner periphery of the first base end 114 and defining the first internal space 111, and an outer surface 116 extending in the first direction between an outer periphery of the first front end 112 and an outer periphery of the first base end 114. The first internal space 111 may extend in the first direction from the first front end 112 to the first base end 114.

The cross section of the emitter holder to be perpendicular to the first direction may have a shape selected from the group consisting of a circle, an ellipse, a semicircle, and a polygon, but not limited thereto.

The first internal space 111 of the emitter holder 110 may be formed in a size appropriate to support the emitter electrode 120 inserted therein. Specifically, the diameter of the first internal space 111 may be 50 nanometers to 10 millimeters, specifically 500 nanometers to 5 millimeters, more specifically 500 nanometers to 2 millimeters.

Back again, the form in which the emitter electrode 120 is mounted to the emitter holder 110 will be described. The emitter electrode 120 is inserted in the first internal space 111 of the emitter holder 110 along the first direction in a state in which the emitter electrode 120 extends along the first direction that is an arbitrary direction shown in FIG. 1.

When the emitter electrode 120 is inserted as such, at least a part of the emitter electrode 120 is, while electrically in contact with the inner surface 118 of the emitter holder 110, inserted in the first internal space 111 and is fixed to the inner surface 118, so that electric currents flow between the emitter holder 110 and the emitter electrode 120.

In this case, when the first direction is perpendicular to the ground, the second base end 124 may be located higher with respect to the ground than the first base end 114 such that a part of the emitter holder is located protruding downward from the second base end 124. In this structure, for example, a member such as a vacuum tube of an X-ray tube, may be coupled to the inner surface 118 of the first internal space 111 between the first base end 114 and the second base end 124.

However, this structure is illustrated in FIGS. 1 and 2 merely to provide a better understanding, and a structure in which the first base end and the second base end are located at the same height may be applied to the field emission apparatus of the present disclosure.

The structure of the field emission apparatus 100 described above may minimize deformation of the emitter electrode 120. Additionally, even if the emitter holder 110 having a relatively high mechanical strength fixes the emitter electrode 120 inserted therein and thereby a predetermined repulsive force occurs on the emitter electrode 120, it is possible to inhibit deformation of the emitter electrode 120, specifically disaggregation of the CNTs 10 and/or the yarns 121.

Figure 7:
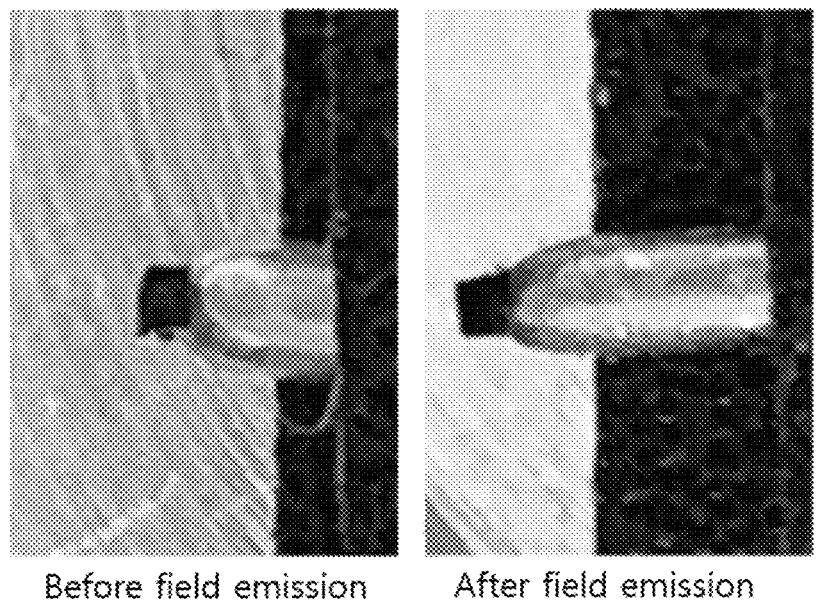
FIG. 7 is photographs taken before and after field emission of a field emission apparatus implemented according to the present disclosure, respectively.
Figure 8:
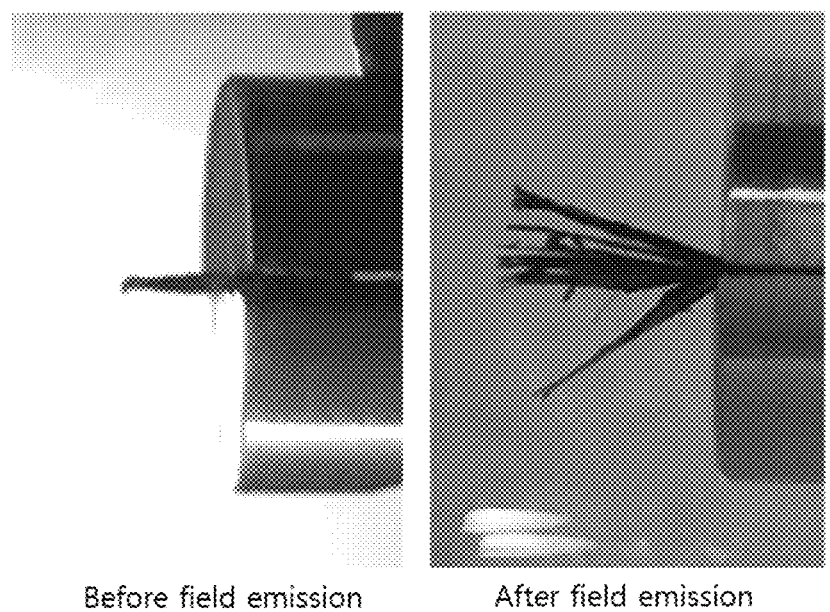
FIG. 8 are photographs taken before and after field emission of a conventional field emission apparatus, respectively.

In relation to the above, FIG. 7 shows photographs taken before field emission (a left-hand photograph) and after field emission (a right-hand photograph) of the field emission apparatus implemented according to the present disclosure, and FIG. 8 shows photographs taken before field emission (a left-hand photograph) and after field emission (a right-hand photograph) of a conventional field emission apparatus which does not include an emitter holder disclosed in the present disclosure.

For reference, the tests for the photographs shown in FIGS. 7 and 8 are conducted in a manner in which the field emission apparatus according to the present disclosure and the conventional field emission apparatus (an emitter electrode alone) are respectively inserted in a tungsten support for an X-ray tube and respectively implement field emission under the same voltage.

Referring to these drawings, in the field emission apparatus according to the present disclosure, the front end from which electrons are emitted is substantially not deformed even after the field emission.

On the other hand, in the conventional field emission apparatus not including an emitter holder, the plurality of CNTs and yarns are disaggregated at the front end from which electrons are emitted, and accordingly, the front end is too deformed to be reused.

One of the factors leading to this result is the inter-electron repulsive force accumulated at the front end as described above.

Considering the above results, the present disclosure may completely solve the conventional problem, that is, deformation of the emitter electrode caused by a repulsive force of accumulated electrons.

Meanwhile, the field emission apparatus 100 may emit electrons in the first direction from the second front end 122 of the emitter electrode 120. In this case, if the second front end 122 is excessively adjacent to the first front end 112 of the emitter holder 110 which is electrically conductive, some of the electrons present at the second front end 122 or some of the electrons emitted from the second front end 122 may be directed toward the first front end 112 having a low resistance and thus move to the emitter holder 110 through the first front end 112. Herein, if the second front end 122 is excessively adjacent to the first front end 112, it may mean, for example, that the distance between the second front end 122 and the first front end 112 is less than 500 micrometers, specifically less than 10 micrometers.

In the present disclosure, the distance between the first front end 112 and the second front end 122 may be defined as a first height H1 that corresponds to a length between the second front end 122 and the first front end 112 in the first direction.

As such, the electrons moving to the first front end 112 are the main factor that causes reduction in the field emission efficiency of the field emission apparatus 100, and thus, it is important to minimize such electrons.

In this regard, as shown in FIGS. 1 and 2, a coupling structure of the emitter electrode 120 and the emitter holder 110 in which the second front end 122 is located protruding relatively further than the first front end 112 may be advantageous.

In the field emission apparatus 100 shown in FIGS. 1 and 2, the second front end 122 may be located higher with respect to the ground than the first front end 112 when the first direction is perpendicular to the ground. Thus, a remaining part of the emitter electrode 120 other than the part inserted in the first internal space 111 may be located protruding upward from the first front end 112.

This structure may be significantly advantageous in inhibiting the tendency of electrodes to be absorbed into the first front end 112 because the second front end 122 and the first front end 112 are spaced a predetermined distance apart from each other.

However, forming the second front end 122 to protrude upward indefinitely by taking into account only the above-described absorption of electrons through the first front end 112 is not preferable.

Specifically, the more excessively the second front end 122 protrudes upward, the more likely the CNTs 10 and/or the yarns 121 are to be disaggregated at a part adjacent to the second front end 122. In addition, as the area of the side of the emitter electrode 120 exposed to the outside is increased, the field emission efficiency in a direction in which the second front end 122 is directed may be rather lowered due to electrons emitted through the side instead of the second front end 122. Herein, if the second front end 122 excessively protrudes, it may mean, for example, that the distance between the second front end 122 and the first front end 112 is at least 20 millimeters, specifically at least 10 millimeters, more specifically above 5 millimeters.

Figure 9:
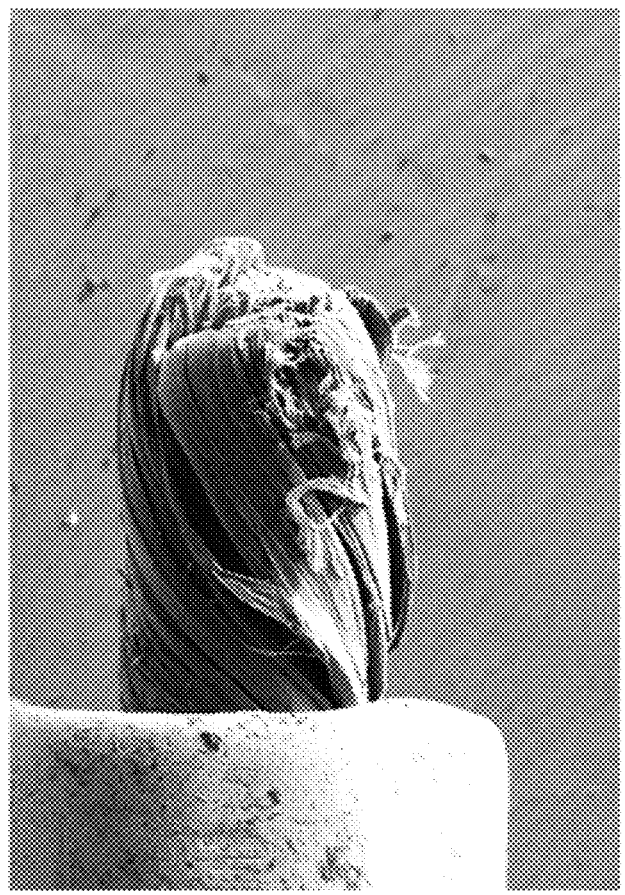
FIG. 9 is a SEM image of a second front end of an emitter electrode in a field emission apparatus according to an embodiment of the present disclosure, the image which is taken by a scanning electron microscope.
Figure 10:
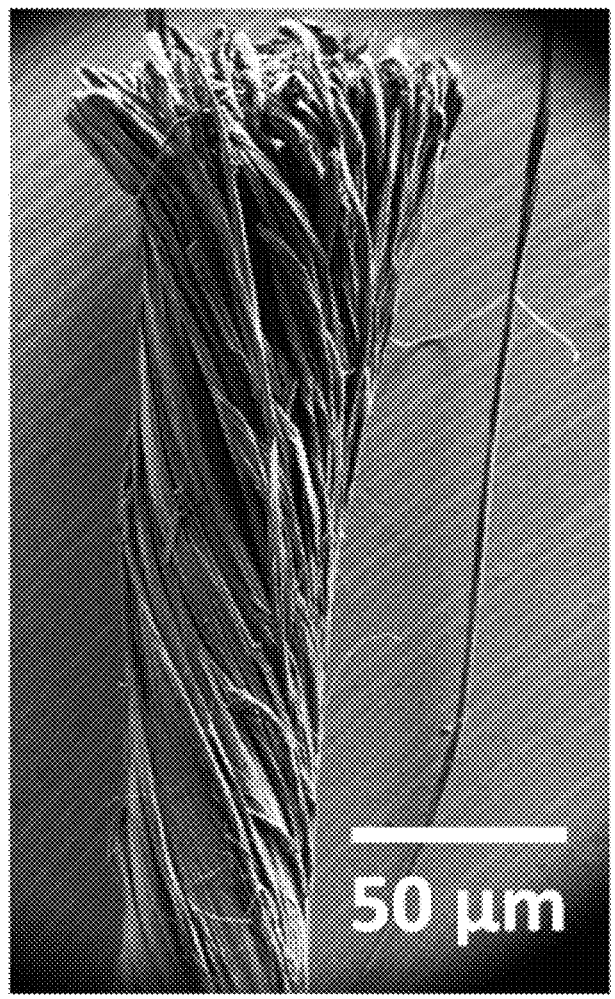
FIG. 10 is a SEM image of a second front end of an emitter electrode in yet another field emission apparatus as a control group for FIG. 9, the image which is taken by a scanning electron microscope.

In this regard, FIG. 9 shows a SEM photograph of a front end of a field emission apparatus with a first height H1 that is an appropriate level according to the teachings of the present disclosure. FIG. 10 also shows an SEM image of a front end of a field emission apparatus with the first height H1 which is a relatively excessive length.

The field emission apparatus of the SEM image taken in FIG. 9 has a first height H1 of about 1 millimeter. When the SEM image of FIG. 9 is examined in detail, the aggregation of CNTs and/or yarns is firmly maintained even at a part adjacent to a second front end of an emitter electrode.

The field emission apparatus of the SEM image taken in FIG. 10 has a first height H1 of approximately 10 millimeters. As seen in the image, CNTs or yarns are disaggregated to some extent at a part adjacent to the second front end of the emitter electrode. (However, this extent of disaggregation does not lead to significant performance degradation of the field emission apparatus, and it should be understood that the SEM image of FIG. 9 is regarded relatively more ideal.)

As seen in the SEM images of FIGS. 9 and 10, it is not desirable to form the second front end to protrude upward unconditionally only in consideration of electron absorption, and it is important to design the first height H1 to an appropriate level.

It should be once again emphasized that the first height H1 needs to have a preferred length that is neither too short nor too long. Accordingly, the present disclosure provides a preferred range of the first height H1.

In one specific example, the first height H1 may be at least 10 micrometers, preferably at least 100 micrometers, and may be at most 20 millimeters, preferably at most 5 millimeters, particularly preferably at most 1 millimeter.

It should also be considered that the first height H1, which corresponds to the degree of protrusion of the second front end 122, forms a predetermined ratio to a total length H2 of the emitter electrode 120.

If the total length H2 of the emitter electrode 120 is relatively short, the first height H1 has a desired length as described above. On the other hand, if a part to be inserted in the emitter holder 110 is designed relatively short, the following problems may be caused.

First, as the force supported by the emitter holder 110 is relatively weak, the CNTs 10 and/or the yarns 121 may be disaggregated at a part adjacent to the second front end 122.

Second, a limited current-carrying path may be formed due to a decrease in the contact area between the emitter holder 110 and the emitter electrode 120, whereby a high resistance may be generated in the emitter electrode 120, lowering the output of the emitter electrode 120.

In the opposite case, if the first height H1 is too long compared to the total length of the emitter electrode 120, the CNTs 10 and/or the yarns 121 may be disaggregated at a part adjacent to the second front end 122.

In summary, when the first height H1 is designed within the above-described preferred range disclosed in the present disclosure and is in proportional harmony with the total length H2 of the emitter electrode 120, both the absorption of electrons through the first front end 112 and the deformation of the emitter electrode 120 may be inhibited as much as possible, and the field emission apparatus may exhibit the optimal field emission efficiency.

Accordingly, the present disclosure provides a preferred range for achieving the above. Specifically, the first height H1, which is the length in the first direction between the second front end 122 and the first front end 112, may be 0.25% to 50%, specifically 1% to 40%, more specifically 5% to 40%, of the second height H2 which is the total length of the emitter electrode 120 in the first direction.

As such, satisfying the ratio calculated by the correlation between the first height H1 and the second height H2 may be advantageous in inhibiting deformation of the emitter electrode 120, especially disaggregation of the CNTs 10 and/or the yarns 121 at the second front end 122 protruding from the first front end 112, and may also be desirable, at the same time, in terms of inhibiting absorption of electrons of the first front end 112.

Meanwhile, as described above, the emitter electrode 120, on the cross section perpendicular to the first direction, may have a length L1 of the longest line among lines that pass through the center of gravity of the cross sectional shape of the emitter electrode 120 and that connect the facing contours of the cross section. The first height H1 may also be determined in consideration of the length L1 of the longest line.

For example, the length L1 of the longest line may be proportional to the amount of electrons emitted from the second front end 122. Therefore, as the length L1 of the longest line increases, the amount of electrons absorbed into the second front end 122 may also increase. Instead, it may be seen that the emitter electrode 120 is more robust in structure when the length L1 of the longest line is relatively long, compared to when the length L1 of the longest line is relatively short. This may be because the π-π interactable area between the CNTs 10 and/or the yarns 121 becomes large.

In summary, when the length L1 of the longest line is long, the emitter electrode 120 may be relatively robust and the above-described deformation of the emitter electrode 120 may be relatively less likely to take place. In this case, however, a relatively large amount of electrons may be absorbed into the second front end 122, and thus, it may be advantageous for the first height H1 to have a relatively long length. In addition, when the length L1 of the longest line is short, it may be desirable for the first height H1 to have a relatively short length for the opposite reason to the reason described above.

Accordingly, the present disclosure provides a preferred range of the first height H1 that may be determined in consideration of the length L1 of the longest line. Specifically, the first height H1 may be 0.25% to 100,000%, specifically 5% to 2,000%, more specifically 10% to 500%, further more specifically 20% to 150%, of the length L1 of the longest line.

As a result, the first height H1 may also be associated with the length L1 of the longest line in addition to the second height H2 described above. However, it is not necessarily required that the first height H1 satisfies a predetermined ratio with respect to the two factors H2 and L1 in all embodiments of the present disclosure. It should be understood that when the first height H1 satisfies the predetermined ratio with respect to the two factors H2 and L1, disaggregation of the carbo nanotubes 10 and/or the yarns 121 and absorption of electrons of the first front end 112 may be inhibited to a more desirable degree, and that a mechanically appropriate strength may be maintained.

In addition, it may be considered to design the emitter holder 110 (a distance (T) from the inner surface to the outer surface) with a thin thickness in terms of narrowing the area of the first front end 112 in order to minimize electron absorption.

However, if the thickness T becomes excessively thin, since it may be difficult to maintain the mechanical strength sufficient to inhibit the deformation of the emitter electrode 120, the thickness T should be carefully selected.

Accordingly, the present disclosure provides a preferred range of the thickness T of the emitter holder 110. Specifically, the thickness T may be 10 micrometers to 10 millimeters.

On the other hand, an emitter holder modified to minimize electrons to be absorbed into the first front end may be considered in the present disclosure.

Figure 4:
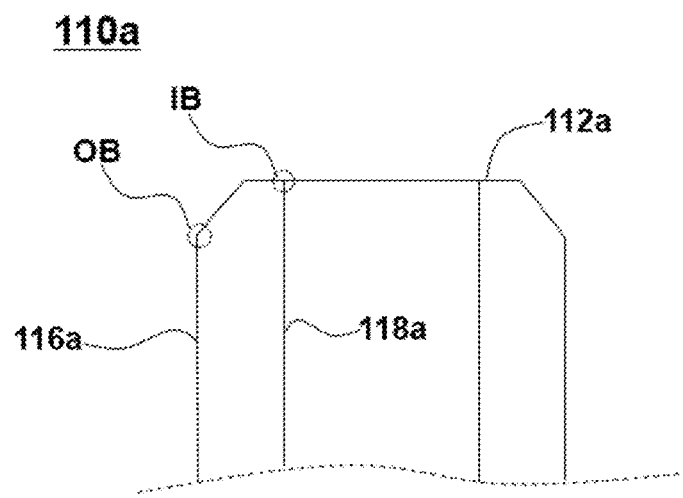
FIG. 4 schematically illustrates an emitter holder according to another embodiment of the present disclosure, that is, a schematic diagram of a vertical cross section of a part adjacent to a first front end of the emitter holder.
Figure 5:
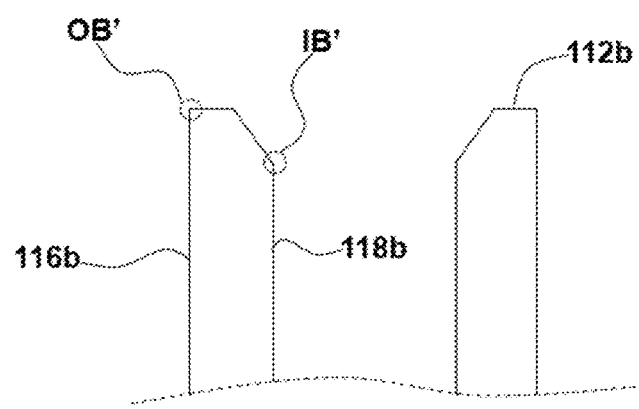
FIG. 5 schematically illustrates an emitter holder according to yet another embodiment of the present disclosure, that is, is a schematic diagram of a vertical cross section of a part adjacent to a first front end of the emitter holder.

In this regard, FIG. 4 shows a vertical sectional view of an emitter holder according to another embodiment of the present disclosure, and FIG. 5 shows a vertical sectional view of an emitter holder according to yet another embodiment of the present disclosure.

First, referring to FIG. 4, when a first direction is perpendicular to the ground, an emitter holder 110a may include an inclination tapered along a circumference of the first front end 112a, so that a boundary OB formed between an outer surface 116a of the emitter holder 110a and an outer periphery of the first front end 112a is located relatively lower than a boundary IB formed between an inner surface 118a of the emitter holder 110a and an inner periphery of the first front end 112a.

Referring to FIG. 5, an emitter holder 110b may include an inclination tapered along a circumference of a first front end 112b, so that a boundary formed by an outer surface 116b of the emitter holder 110b and an outer periphery of a first front end 112b is located relatively higher than a boundary formed between an inner surface 118b of the emitter holder 110b and an inner periphery of the first front end 112b.

The emitter holders 110a and 110b illustrated in FIGS. 4 and 5 are advantageous in structure in that a part of the first front end 112 adjacent to the second front end 122 has a relatively narrower area, thereby minimizing absorption of electrons through the first front end 112.

In some cases, an electrically insulating material may be coated on the surface of the first front end 112 in order to inhibit the absorption of electrons through the first front end 112, and this may be independently applied to each emitter holder illustrated in FIGS. 1, 2, 4, and 5.

Figure 6:
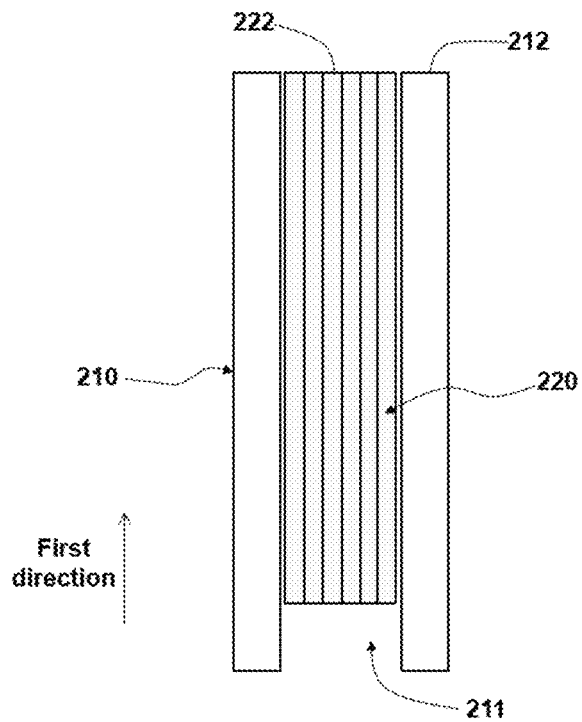
FIG. 6 is a schematic diagram of a field emission apparatus according to yet another embodiment of the present disclosure.

FIG. 6 is a schematic diagram of a field emission apparatus according to yet another embodiment of the present disclosure.

A field emission apparatus 200 shown in FIG. 6 is similar to the above-described field emission apparatus 100 shown in FIGS. 1 and 2, but there is a slight difference in terms of coupling between an emitter holder 210 and an emitter electrode 220.

Specifically, when a first direction is perpendicular to the ground, the field emission apparatus 200 shown in FIG. 6 may be configured such that a first front end 212 of the emitter holder 210 and a second front end 222 of the emitter electrode 220 are located at the same height.

In this structure, a whole emitter electrode 220 is inserted in a first internal space 211 of the emitter holder 210. Thus, it is advantageous in structure to substantially completely inhibit deformation of the second front end 222 through which electrons are to be emitted.

However, since the emitted electrons may be absorbed into the first front end 212, an electrically insulating material may be coated on the surface of the first front end 212, and emitter holders 110a and 110b shown in FIGS. 4 and 5 may be used.

The field emission apparatus according to the present disclosure includes an emitter electrode including CNTs and an emitter holder to which the emitter electrode is stably mounted.

The emitter holder includes a first internal space communicated in a first direction. The emitter electrode includes one or more yarns each having a structure extending the first direction in which a plurality of CNTs that extend in the first direction are aggregated. Here, the field emission apparatus has a structure in which at least a part of the emitter electrode is inserted in the first internal space of the emitter holder along the first direction and fixed thereto.

This structure ensures structural stability, whereby disaggregation of CNTs or yarns is inhibited by the emitter holder even when a repulsive force occurs due to accumulated electrons in the emitter electrode.

Therefore, the field emission apparatus according to the present disclosure is capable of solving the conventional problem, that is, disaggregation of CNTs by a repulsive force caused by accumulated electrons.

While the present disclosure has been described with reference to the embodiments, it is to be understood that various changes and modifications may be made without departing from the spirit and scope of the present disclosure.

What is claimed is:

1. A field emission apparatus, comprising:
a pipe-shaped emitter holder comprising an electrically conductive material and a first internal space communicated in a first direction; and an emitter electrode comprising one or more yarns each having a structure extending in the first direction in which a plurality of carbon nanotubes (CNTs) that extend in the first direction are aggregated, wherein the emitter electrode is inserted in the first internal space of the emitter holder while extending along the first direction, wherein the emitter holder comprises a band-shaped first front end, a band-shaped first base end, an inner surface extending in the first direction between an inner periphery of the first front end and an inner periphery of the first base end and defining the first internal space, and an outer surface extending in the first direction between an outer periphery of the first front end and an outer periphery of the first base end, wherein the first internal space extends in the first direction from the first front end to the first base end, wherein the emitter electrode comprises a second front end and a second base end, and wherein, when the first direction is perpendicular to the ground, the second base end is located higher with respect to the ground than the first base end such that a part of the emitter holder is located protruding downward from the second base end.

2. The field emission apparatus of claim 1, wherein the emitter electrode is inserted in the first internal space with at least a part thereof electrically in contact with an inner surface of the emitter holder, so that electric currents flow between the emitter holder and the emitter electrode.

3. The field emission apparatus of claim 1, wherein, when the first direction is perpendicular to the ground, the second front end is located higher with respect to the ground than the first front end such that a remaining part of the emitter electrode other than a part inserted in the first internal space is located protruding upward from the first front end.

4. The field emission apparatus of claim 3, wherein a first height, which is a length in the first direction between the second front end and the first front end, is 0.25% to 50% of a second height, which is a total length of the emitter electrode in the first direction.

5. The field emission apparatus of claim 3, wherein a first height, which is a length in the first direction between the second front end and the first front end, is 0.25% to 100,000% of a length of a longest line among lines that pass through a center of gravity of a cross sectional shape of the emitter electrode and that connect opposing contours of the shape.

6. The field emission apparatus of claim 1, wherein an electrically insulating material is coated on a surface of the first front end.

7. The field emission apparatus of claim 1, wherein the emitter holder is formed of at least one material selected from a group consisting of tungsten, zinc, nickel, copper, silver, aluminum, gold, platinum, tin, stainless steel and conductive ceramics.

8. The field emission apparatus of claim 1, wherein each of the yarns is formed of a plurality of CNTs with sides thereof aligned side by side in the first direction, and the contiguous sides of the plurality of CNTs are aggregated by π-π interactions to constitute each yarn.

9. The field emission apparatus of claim 1, wherein the emitter electrode comprises a plurality of yarns with sides thereof aligned side by side in the first direction, and the contiguous sides of the plurality of yarns are coupled to one another by π-π interactions.

10. An X-ray tube comprising a field emission apparatus according to claim 1.

11. A field emission apparatus, comprising:
a pipe-shaped emitter holder comprising an electrically conductive material and a first internal space communicated in a first direction; and
an emitter electrode comprising one or more yarns each having a structure extending in the first direction in which a plurality of carbon nanotubes (CNTs) that extend in the first direction are aggregated, wherein the emitter electrode is inserted in the first internal space of the emitter holder while extending along the first direction, wherein the emitter holder comprises a band-shaped first front end, a band-shaped first base end, an inner surface extending in the first direction between an inner periphery of the first front end and an inner periphery of the first base end and defining the first internal space, and an outer surface extending in the first direction between an outer periphery of the first front end and an outer periphery of the first base end, wherein the first internal space extends in the first direction from the first front end to the first base end, wherein the emitter electrode comprises a second front end and a second base end, and;

wherein, when the first direction is perpendicular to the ground, the first front end comprises:

an inclination tapered along a circumference of the first front end such that a boundary formed between the outer surface of the emitter holder and the outer periphery of the first front end is located relatively lower than a boundary formed between the inner surface of the emitter holder and the inner periphery of the first front end; or an inclination tapered along a circumference of the first front end such that a boundary formed between the outer surface of the emitter holder and the outer periphery of the first front end is located relatively higher than a boundary formed between the inner surface of the emitter holder and the inner periphery of the first front end.

12. The field emission apparatus of claim 11, wherein, when the first direction is perpendicular to the ground, the first base end is located at the same height as the second base end.

13. The field emission device of claim 11, wherein, when the first direction is perpendicular to the ground, the second front end is located higher with respect to the ground than the first front end such that a remaining part of the emitter electrode other than a part inserted in the first internal space is located protruding upward from the first front end.

14. The field emission device of claim 13, wherein a first height, which is a length in the first direction between the second front end and the first front end, is 0.25% to 50% of a second height, which is a total length of the emitter electrode in the first direction.

15. The field emission device of claim 13, wherein a first height, which is a length in the first direction between the second front end and the first front end, is 0.25% to 100,000% of a length of a longest line among lines that pass through a center of gravity of a cross sectional shape of the emitter electrode and that connect opposing contours of the shape.

16. The field emission device of claim 11, wherein an electrically insulating material is coated on a surface of the first front end.

17. A field emission apparatus, comprising:
a pipe-shaped emitter holder comprising an electrically conductive material and a first internal space communicated in a first direction; and
an emitter electrode comprising one or more yarns each having a structure extending in the first direction in which a plurality of carbon nanotubes (CNTs) that extend in the first direction are aggregated,
wherein the emitter electrode is inserted in the first internal space of the emitter holder while extending along the first direction,
wherein the emitter holder comprises a band-shaped first front end, a band-shaped first base end, an inner surface extending in the first direction between an inner periphery of the first front end and an inner periphery of the first base end and defining the first internal space, and an outer surface extending in the first direction between an outer periphery of the first front end and an outer periphery of the first base end,
wherein the first internal space extends in the first direction from the first front end to the first base end,
wherein the emitter electrode comprises a second front end and a second base end, and
wherein, when the first direction is perpendicular to the ground, the first front end is located at the same height as the second front end.

18. The field emission device of claim 17, wherein, when the first direction is perpendicular to the ground, the second front end is located higher with respect to the ground than the first front end such that a remaining part of the emitter electrode other than a part inserted in the first internal space is located protruding upward from the first front end.

19. The field emission device of claim 18, wherein a first height, which is a length in the first direction between the second front end and the first front end, is 0.25% to 50% of a second height, which is a total length of the emitter electrode in the first direction.

20. The field emission device of claim 18, wherein a first height, which is a length in the first direction between the second front end and the first front end, is 0.25% to 100,000% of a length of a longest line among lines that pass through a center of gravity of a cross sectional shape of the emitter electrode and that connect opposing contours of the shape.

* * * * *